UNITED STATES PATENT OFFICE 1,999,096

HEAT CONVERTIBLE RESIN AND PROCESS

Arthur Haroldson, Valparaiso, Ind., assignor to Continental Diamond Fibre Company, Newark, Del., a corporation of Delaware No Drawing. Application November 20, 1930,
Serial No. 497,075

3 Claims. (Cl. 260—8)

My present invention relates in general to resinous compositions and refers more particularly to heat convertible resins, that is to say, gummy compositions which may be rendered insoluble and non-fusible by the application of heat. Compositions of this general characteristic are useful in the production of molded articles, electrical insulation, varnishes and the like, and my invention more particularly relates to the production of a heat convertible synthetic resin resulting from the reaction of an aliphatic ether alcohol or derivative thereof, a polybasic aromatic acid and a mixture of glycerol and a natural resin.

I propose to produce a tough heat curable resin having improved characteristics by employing an entirely new principle and reaction involving the use of ingredients which heretofore have been thought incapable of producing a heat convertible resin. The present invention comprises a continuation in part of my co-pending application for Resinous composition, Serial No. 365,790, filed May 24, 1929.

An important object of my present invention is to provide a hard, tough and elastic resin having improved electrical and mechanical characteristics.

Another important object of my invention is to provide a resin which, in its unreacted state, is readily soluble in inexpensive solvents and which consequently may be applied cheaply and conveniently.

Another object is to provide a novel resinous compound which, in its uncured state, is readily soluble in cheap solvents and which is insoluble and non-fusible when cured, whereby paper, asbestos and other fibrous and fabric materials may be cheaply impregnated with the compound and cured to produce molded or laminated materials.

Another important object of my present invention is to provide a cheap resin of the class described which, in its final cured form, is insoluble, non-fusible and inert and which will not deteriorate in the presence of moisture, oil or any of the commonly known organic solvents even in the presence of heat.

Numerous other objects of my present invention will be more fully understood from the following description of the preferred mode in which I carry out the practice of my invention.

I have found that if phthalic anhydride be heated with a polyglycol, or mixed polyglycols or derivatives thereof, a soft, gummy, non-heat convertible resin, which is soluble in most organic solvents, is produced. This resin has little commercial value because of its softness, low melting point and because it is non-convertible by heat. The resin, however, may be used for some purposes. However, I have made the further discovery that if glycerol or its equivalent alcohol, or shellac or its equivalent natural resin, or a mixture of glycerol and shellac or its equivalents, is introduced as an ingredient at the start of the reaction, a heat convertible resin having extremely valuable characteristics is obtained. This resin in its initial stage is fusible and soluble in most solvents and can be converted into an inert infusible insoluble substance by the application of heat.

In order to produce the heat convertible resin of my present invention I employ the following ingredients:

A suitable polyglycol, phthalic anhydride and a substance embodying carboxyl and hydroxyl groups or a polyhydric alcohol possessing more than two hydroxyl groups in its composition.

For the polyglycol ingredient I prefer to employ diethylene glycol, although any polyglycol, mixed polyglycol or alkyl ether ether derived from a polyglycol or mixed polyglycol may be used. For example, I may substitute for the diethylene glycol, any of the following, either singly or employed together as a mixture:

Triethylene glycol monoethyl ether, diethylene glycol monoethyl ether, triethylene glycol, ethylene propylene diglycol or alkyl ethers derived from these compounds.

Citric acid, tartaric acid or succinic acid or phthalic acid or other polybasic aromatic acids or polycarboxylic acids may be used instead of the phthalic anhydride.

For the carboxyl-hydroxyl ingredient I prefer to employ a natural resin, preferably shellac and a polyhydric alcohol, preferably glycerol, although successful results can be obtained by using either the resin or the alcohol alone. Congo gum and other natural resins may be employed in place of shellac.

The preferred ingredients may be mixed together in accordance with the following formula:

| | Grams |
|---|---|
| Polyglycol (diethylene glycol) | 967 |
| Polybasic acid (phthalic anhydride) | 2480 |
| Natural resin (shellac) | 450 |
| Polyhydric alcohol (glycerol) | 685 |

It will be seen from the above example that 9.12 mols of diethyleneglycol and 7.44 mols of glycerol are reacted with 16.75 mols of phthalic anhydride.

By heating this mixture and properly controlling the temperature during the reaction a tough, hard fusible resin is obtained. The heat is applied gradually and the temperature raised until the phthalic anhydride ingredient is completely dissolved. The temperature is then raised gradually to 175-180° C., and maintained until all reaction between the ingredients ceases. Thereafter by gradually heating the batch to a temperature of 205° C., a tough, hard, fusible resin is obtained.

When shellac or its equivalent carboxyl-hydroxyl composition is incorporated with a polyglycol—phthalic anhydride resin, a heat convertible resin is obtained, whereas if polyglycol and phthalic anhydride be reacted alone, a heat non-convertible resin is obtained. The initial reaction in the production of the heat convertible resin is condensation and the later reactions are polymerization. It appears that the carboxyl-hydroxyl ingredient (shellac) forms a partially heat convertible resin from the non-heat convertible polyglycol, phthalic anhydride resin. This is also true if glycerol is used instead of shellac. It appears that the carboxyl (COOH) and the hydroxyl (OH) groups are both active in causing polymerization during the later stages of the reaction, which polymerization causes the heat conversion, since I have found that, when shellac or glycerol are absent, heat conversion during the later stages of the reaction does not occur. Apparently, the hydroxyl group is most active in causing polymerization as it appears that glycerol accelerates the rate of polymerization to a greater degree than shellac.

The resin passes through three distinct stages which can be classified as follows:

Class A.—The initial stage in which the resin is soluble in acetone, is fusible between 90° C. and 105° C. and is not resistant to cold water. Upon further heating the resin passes into the B class.

Class B.—The intermediate stage in which the resin is insoluble in acetone, non-fusible, can be molded under heat and pressure and is not resistant to cold water. Upon further heating polymerization takes place and the Class B resin passes into the C class.

Class C.—The final stage in which the resin is insoluble in acetone, is non-fusible, can be molded under heat and pressure and is highly resistant to cold water. The resin is also insoluble in glycerol.

The Class A resin upon being melted becomes exceedingly elastic and possesses the characteristic properties of rubber. Upon further heating the resin becomes plastic but still retains its elastic properties. It adheres well to all forms of metal, wood, paper and mica which render the resin especially useful as a binder in the manufacture of mica plate. This resin has a lower melting point than the corresponding Class A resin made from glycerol and phthalic anhydride which was first described by Watson Smith in the Journal of Society of Chemical Industry (London) 1901, volume 20, page 1075, and which resin has since been popularized as "Glyptal". The resin of my present invention thus has increased fluidity when melted with the result that it will distribute itself, much more evenly between thin flakes of mica and greater uniformity of binder distribution is obtained than when "Glyptal" is used.

The Class A resins of my present invention when heated changes into a resin of the B class. If the heating is continued for twenty-five minutes at 205° C., a homogeneous bubble-free Class B resin is obtained. If the temperature is increased to 250° C., a violent reaction takes place accompanied by bubbling and frothing. However, if the resin is heated for a long time slightly below its fusion point, the frothing is practically eliminated and a bubble-free B class resin is obtained. The B class resin may be heated at a higher temperature without danger of frothing and at 270° C. additional polymerization takes place and the material is converted into a Class C resin, which is extremely inert.

My present resin in the Class B and C stages is tougher and more flexible than the corresponding resins made from glycerol and phthalic anhydride. For this reason my resin finds extensive use in the manufacture of composite mica products, such for instance as mica plate, mica commutator insulating rings, etc.

Resins made from glycerol and phthalic anhydride according to the teachings of Watson Smith harden rapidly and become exceedingly brittle and considerable difficulty is encountered in molding, punching, cutting and otherwise operating upon composite mica products in which such a resin has been employed as a binder. The use of my present invention as a binder in composite mica products renders the finished product more flexible and if the mica product is to be molded, the resin binder may be readily kept in a fusible form so that upon warming, as on a steam table, the product becomes soft and very elastic and can be molded without trouble. This cannot be readily accomplished with the "Glyptal" resins. Mica plate made with the resin of my present invention as a binder can be molded without difficulty, can be clearly stamped to produce notched pieces of intricate outline and can be cut and sawed without producing ragged and uneven edges.

My new resin also can be readily used in the manufacture of insulating varnishes and in the production of moldable material and fibrous or cellular materials may be readily and cheaply impregnated with my resin since, in its fusible soluble state, my resin is readily soluble in alcohol-benzol solvents. This is an advantage over resins of the same general character heretofore provided, all of which are difficultly soluble in the above mentioned inexpensive solvents and hence have to be applied as a solution in which an expensive solvent such as acetone is used as a carrier.

While resins of the A and B class are not entirely resistant to cold water, they are more so than the corresponding classes of resins made from glycerol and phthalic anhydride. My resin is, therefore, not subject to changes in atmospheric conditions and mica plate pasted with my resin as a binder does not change color or become flocculent when subjected to atmospheric changes as is the case with mica plate pasted with "Glyptal". My resin, therefore, may advantageously be used as a binder for mica plate used for art purposes, such as in the production of lamp shades and the like. My resin furthermore does not darken with age and neither sunlight nor ultra violet rays have any appreciable effect upon its color and it is thus possible to mix pigments with my new resin without forming cloudy effects or dark spots as is usually the case in resins of similar character heretofore provided.

It is thought that the invention and numerous of its attendant advantages will be understood from the foregoing description and numerous changes may be made in the ingredients, their relative proportions and the method of preparing same without departing from the spirit and scope of my invention or sacrificing any of its attendant advantages.

I do not herein claim the non-heat convertible resin produced by heating a polyglycol, that is to say, an aliphatic ether alcohol or its equivalent or derivatives with phthalic anhydride or an equivalent polybasic acid, since the same forms the subject matter of my co-pending application, Serial No. 380,267, filed July 22, 1929; nor do I claim herein the heat convertible resin produced by the reaction of a polyglycol or its derivative with phthalic anhydride or an equivalent acid and glycerol alone, since the same forms the subject matter claimed in my aforesaid co-pending application, Serial No. 365,790, filed May 24, 1929, of which the present application comprises a continuation in part; nor do I claim herein the heat convertible resin produced by heating a polyglycol or its derivative with phthalic anhydride or an equivalent acid and a natural resin alone, since the same forms the subject matter claimed in my co-pending application, Serial No. 497,076 filed of even date herewith.

Having thus described my invention what I claim as new and desire to secure by Letters Patent is:

1. The step in the process of preparing a tough, hard, fusible resinous product convertible by heat into an infusible product involving the reaction of shellac, a dibasic organic acid, a polyglycol, and glycerol, there being present substantially 16.75 mols. of a dibasic organic acid, 9.12 mols. of the polyglycol, and 7.44 mols. of glycerol, which comprises heating the initial reaction product of said components at a temperature not exceeding approximately 205° C. until substantially all the water of the reaction is removed and a product of the stated properties is obtained.

2. The process of preparing a tough, hard, fusible resinous product convertible by heat to an infusible product, which comprises reacting shellac, phthalic anhydride, a polyglycol, and glycerol, there being present substantially 16.75 mols. of phthalic anhydride, 9.12 mols. of the polyglycol, and 7.44 mols. of glycerol, heating said initial reaction product of said components at a temperature not exceeding approximately 205° C. until substantially all the water of the reaction is removed and a product of the stated properties is obtained.

3. A tough, hard, heat-convertible resinous product made by reacting shellac, a dibasic organic acid, a polyglycol, and glycerol, there being present substantially 16.75 mols. of a dibasic organic acid, 9.12 mols. of the polyglycol, and 7.44 mols. of glycerol, in accordance with process of claim 1.

ARTHUR HAROLDSON.